United States Patent [19]

Diamond

[11] Patent Number: 4,636,790

[45] Date of Patent: Jan. 13, 1987

[54] ADDRESSABLE PORT TELEMETRY SYSTEM

[75] Inventor: Anthony E. Diamond, San Diego, Calif.

[73] Assignee: Teleplex Corporation, San Diego, Calif.

[21] Appl. No.: 561,567

[22] Filed: Dec. 15, 1983

[51] Int. Cl.[4] ................................................ H04Q 9/00

[52] U.S. Cl. ............................ 340/825.52; 340/825.08

[58] Field of Search ....................... 340/825.52, 825.05, 340/825.07, 825.08, 825.5; 375/3, 94; 370/85

[56] References Cited

U.S. PATENT DOCUMENTS

| | | | |
|---|---|---|---|
| 4,241,444 | 12/1980 | Kister | 370/85 |
| 4,322,849 | 3/1982 | Calabrese | 375/3 |
| 4,373,183 | 2/1983 | Means et al. | 340/825.5 |
| 4,413,341 | 11/1983 | Markhasin et al. | 340/825.07 |
| 4,429,405 | 1/1984 | Bux et al. | 375/94 |
| 4,456,790 | 6/1984 | Soyack | 340/825.08 |

*Primary Examiner*—Donald J. Yusko

*Attorney, Agent, or Firm*—Edward W. Callan

[57] ABSTRACT

An improved telemetry system for transferring data signals to and from a plurality of serially-connected, addressable data ports. The telemetry system includes a plurality of serially-connected input/output (I/O) data ports; an output data line and an input data line serially-connecting the data ports; a clock signal generator for generating clock pulses and frame pulses for common system timing; and a clock line for carrying the clock pulses and frame pulses from the clock signal generator to the ports. Each data port contains an address circuit which determines when during each frame that port is enabled to transfer data an input shift register for loading data signals for transfer onto the input data line at a time indicated by a transfer signal provided by the address circuit; and an output shift register for temporarily storing output data signals received from the output data line immediately prior to the provision of the transfer signal by the address circuit.

6 Claims, 1 Drawing Figure

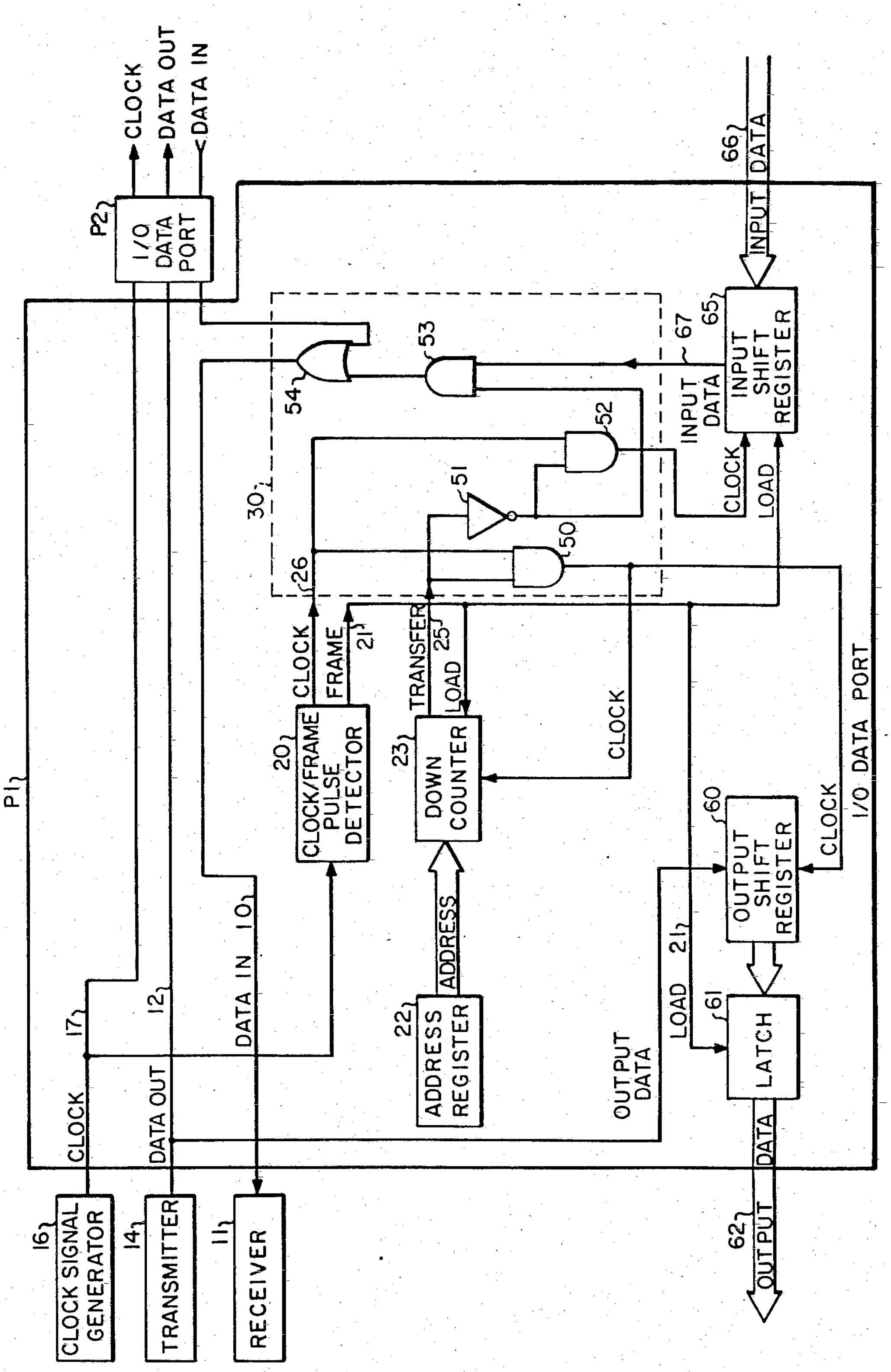
CLOCK
DATA OUT
DATA IN
P2
I/O DATA PORT
66
INPUT DATA
65
INPUT SHIFT REGISTER
67
INPUT DATA
CLOCK
LOAD
53
54
52
51
50
30
26
CLOCK
FRAME
21
TRANSFER
25
LOAD
20
CLOCK/FRAME PULSE DETECTOR
23
DOWN COUNTER
CLOCK
I/O DATA PORT
CLOCK
60
OUTPUT SHIFT REGISTER
P1
ADDRESS
22
ADDRESS REGISTER
DATA IN 10
17
12
21
LOAD
61
LATCH
OUTPUT DATA
CLOCK
DATA OUT
DATA
16
CLOCK SIGNAL GENERATOR
14
TRANSMITTER
11
RECEIVER
62
OUTPUT

ADDRESSABLE PORT TELEMETRY SYSTEM

BACKGROUND OF THE INVENTION

This invention relates in general to telemetry systems and is more particularly directed to systems with serially-connected, addressable data ports. Among other uses, telemetry systems commonly are used to transfer data from a plurality of equipment monitors and to transfer data to a plurality of equipment controls.

Telemetry systems for transferring data from and to transmitters and receivers to and from a plurality of equipment controls and monitors are made in many configurations for various specific uses. Among the parameters determining which telemetry system configuration is utilized are access time, simplicity of use, and cost. Because the cost of transmission lines can be considerable, particularly where long distances between the transmitter or receiver and the equipment controls or monitors are involved, systems utilizing only one output data line and/or one input data line are desirable. Such a system is described in U.S. pat. application Ser. No. 428,545 by Herbert Alan Schwan filed Sept. 30, 1982, now abandoned, for "TELEMETRY SYSTEM FOR DISTRIBUTED EQUIPMENT CONTROLS AND EQUIPMENT MONITORS". In such system, data ports coupled to the controls and monitors are attached to the respective output or input data line serially as shift register stages. The output data from the transmitter is shifted down the output data line with each shift being clocked by a clock pulse, until the data reaches the shift register stage (data ports) for the last equipment control. At that time a clock frame pulse simultaneously enables all of the shift register stages (data ports) to transfer their instant data to their respective equipment controls. Input data is shifted up the input data line to the receiver in the same manner from data ports that are coupled to the equipment monitors and which are connected to each other in series to function as stages of a shift register.

SUMMARY OF THE INVENTION

This invention is an improved telemetry system for transferring data signals to and/or from a plurality of serially-connected data ports. One aspect of the system of the present invention essentially includes a plurality of input data ports, an input data line serially-connecting the data ports to a receiver for carrying the input data signals, and an address circuit at each port for determining when that port is enabled to transfer input data signals onto the input data line independent of the port's physical location on the input data line.

Such system further includes a clock signal generator for generating clock pulses and frame pulses for common system timing, wherein each frame pulse defines a frame of clock pulses, The address circuit includes a frame pulse detector connected to the clock line for providing a frame detect signal to a clock pulse counter in response to each frame pulse, an address register for storing a preselected count that determines the time at which the port is enabled to transfer data onto the input data line, a clock pulse counter for counting clock pulses beginning with each frame detect signal and coupled to the address register for providing a transfer signal when the clock pulse count equals the stored preselected count, and a transfer control circuit coupled to the clock pulse counter for enabling the input data signal to be transferred onto the input data line when the transfer signal is provided by the clock pulse counter.

Each port also includes an input shift register that responds to each frame detect signal by loading input data signals for transfer onto the input data line. The input shift register is connected to the transfer circuit and provides the input data signals to the transfer circuit in response to subsequent clock signals during each frame only after the transfer signal is provided by the clock pulse counter.

Another aspect of the system of the present invention essentially includes a plurality of output data ports, an output data line serially-connecting the data ports to the transmitter for carrying the output data signals to the ports from the transmitter, and an address circuit at each port for determining when that port is enabled to received output data signals from the output data line. It is noted that while the data ports are connected in series mechanically by a single output data line, the output data line is connected in parallel electrically to the respective data ports. Each data port also includes an output shift register that is connected to the transfer circuit and is responsive to the clock signals for temporarily storing output data signals received from the output data line immediately prior to the provision of the transfer signal by the address circuit; and a latch connected to the output shift register for unloading the temporarily stored output data signals from the output shift register in response to each detection of the frame signal.

Another aspect of the system of the present invention essentially combines both of the above mentioned aspects into a single input/output (I/O) data port having a single address which determines when that port is enabled to transfer data.

Other features of the present invention are described in relation to the detailed description of the invention.

BRIEF DESCRIPTION OF THE DRAWING

FIG. 1 is a combination block and schematic diagram of a preferred embodiment of an addressable data port according to the present invention.

DETAILED DESCRIPTION OF THE INVENTION

Referring to FIG. 1, a preferred embodiment of the addressable port telemetry system of the present invention includes a plurality of input/output (I/O) ports P1,P2, . . . an input data line 10 serially-connecting the data ports P1, P2, . . . to a receiver 11 for carrying input data signals from the data ports P1, P2, . . . to the receiver 11, and an output data line 12 serially-connecting the data ports P1, P2, . . . to a transmitter 14 for carrying output data signals to the data ports P1, P2, . . . from the transmitter 14, and an address circuit at each data port P1, P2, . . . for determining when that port is enabled to transfer input data signals onto the input data line 10 and to receive output data signals from the output data line 12 independent of the port's physical location on the data lines 10, 12.

The system of the present invention further includes a clock signal generator 16 for generating clock pulses and frame pulses for a common system timing, wherein each frame pulse defines a frame of clock pulses. The system also includes a clock line 17 for carrying the clock pulses and frame pulses from the clock signal generator 16 to the data ports P1, P2, . . . .

The address circuit includes a clock/frame pulse detector 20, an address register 22, a clock pulse counter 23, and a transfer control circuit 30. The clock/frame pulse detector 20 is connected to the clock line 17 for providing a frame detect signal on line 21 in response to each frame pulse on line 17 and for passing the clock pulses from line 17 onto line 26. The address register 22 stores a preselected count that determines the time at which the port P1 is enabled to receive output data signals from the output data line 12 and to transfer input data signals onto the input data line 10. The clock pulse counter 23 counts clock pulses beginning with each frame detect signal on line 21 from the frame pulse detector 20. The address register 22 includes a plurality of parallel binary switches which can be set to a preselected count corresponding to the port's address. The clock pulse counter 23 is a down counter, which is connected to the address register 22 for receiving the preselected count from the address register 22 as a beginning count in response to a frame detect signal on line 21 from the clock/frame pulse detector 20.The clock pulse counter 23 provides a binary "low" transfer signal on line 25 when the clock pulse count reaches the stored preselected count in the address register 22. The signal on line 25 is "high" while the clock pulse counter 23 counts down from the beginning of each frame. The transfer control circuit 30 is coupled to the clock pulse counter 23 for transferring the input data signal onto the input data line 10 and for transferring output data signals from the output data line 12 in response to the "low" transfer signal on line 25 from the clock pulse counter 23.

The transfer control circuit 30 includes a first AND gate 50 having inputs coupled to the transfer signal line 25 and the clock line 26. The AND gate 50 transfers clock pulses to the clock pulse counter 23 and to an output shift register 60 while the signal on line 25 is high, and withholds the clock pulses in response to the "low" transfer signal on line 25.

An output shift register 60 is coupled to the output data line 12 and to the first AND gate 50 for receiving output data signals from the output data line 12 in response to clock pulses from the first AND gate 50. A latch 61 is connected to the output of the output shift register 60. When a frame detect signal is provided on line 21, the latch 61 loads the data then in the output shift register 60 and provides the loaded data to an equipment control (not shown) via output data lines 62. When the "low" transfer signal is provided on line 25 the AND gate 50 is inhibited from further providing clock signals to clock output data signals into the output shift register 60. Thus the output data transferred from the output data line 12 to the equipment control connected to output data lines 62 of the port P1 is the output data that is clocked into the output shift register 60 immediately prior to the provision of the "low" transfer signal on line 25.

The transfer control circuit 30 further includes an inverter 51, a second AND gate 52, a third AND gate 53 and an OR gate 54. The inverter 51 inverts the "low" transfer signal on line 25 to enable both the second AND gate 52 and the third AND gate 53 when the clock pulse count of the down counter 23 reaches the stored preselected count in the address register 22. The second AND gate 52 has its inputs coupled to the clock line 26 and the output of the inverter 51. The second AND gate 52 transfers the clock pulses from line 26 to an input shift register 65 when the "low" transfer signal is provided on line 25.

The input shift register 65 receives input data from an equipment monitor (not shown) via input data lines 66. The input data on input data lines 66 is loaded into the input shift register 65 each time a frame detect signal is provided on line 21. Thus during each frame the input data, which is loaded into the shift register at the beginning of each frame, is clocked out of the shift register 65 onto its output line 67 when the clock signals are first provided by the second AND gate 52 upon the "low" transfer signal being provided on line 25.

The third AND gate 53 has its inputs, coupled to the output of the inverter 51 and the output line 66 of the input shift register 65. The output of the third AND gate 53 is connected to one input of the OR gate 54. The OR gate 54 has its other input connected to the input data line 10 to receive input data transferred onto the input data line 10 by the other ports P2, . . . that are more remote than the port P1 from the receiver 11. The output of the OR gate 54 is connected to the input data line 10 to provide input data to the receiver 11. The third AND gate 53 is enabled to provide the input data from the input shift register 65 to the OR gate 54 and thence onto the input data line 10 for delivery to the receiver 11 only after the "low" transfer signal is provided on line 25. The input data provided from the input shift register 65 of the port P1 in the time slot defined by the address stored in the address register 22 is merged with input data signals transferred onto the input data line 10 from the other ports P2, . . . during their respective time slots. The third AND gate 54 prevents the data in the input shift register 65 from being inadvertently transferred onto the input data line 10 prior to the addressed time slot of the port P1.

From the foregoing description, it will be seen that the present invention provides an extremely simple, efficient, and reliable manner of addressing a data port so that it may be accessed independent of its physical location on the data line.

What is claimed is:

1. A telemetry system for transferring input data signals from a plurality of serially-connected input data ports to a receiver, said system comprising a plurality of input data ports;

an input data line serially-connecting the data ports to the receiver for carrying the input data signals from the ports to the receiver; and a clock signal generator for generating clock pulses and frame pulses for common system timing, where each frame pulse defines a frame of clock pulses;

wherein each data port comprises an address circuit for determining when that port is enabled to transfer input data signals onto the input data line, wherein the address circuit comprises a frame pulse detector connected to the clock line for providing a frame detect signal to a clock pulse counter in response to each frame pulse;

an address register for storing a preselected count that determines when the port is enabled to transfer data onto the input data line;

a clock pulse counter for counting clock pulses beginning with each frame detect signal and coupled to the address register for providing a transfer signal when said clock pulse count equals the stored preselected count; and a transfer control circuit coupled to the clock pulse counter for enabling the input data signals to be transferred onto the input data line to merge with input data signals transferred onto the input data line from the other ports when the transfer signal is provided by the clock pulse counter; and an input shift register that responds to each frame detect signal by loading input data signals for transfer onto the input data line, wherein the input shift register is connected to the transfer control circuit and provides the input data signals to the transfer control circuit in response to subsequent clock signals during each frame only after the transfer signal is provided by the clock pulse counter.

2. A system according to claim 1, further comprising a clock line for carrying the clock pulses and frame pulses from the clock signal generator to the data ports.

3. A telemetry system for transferring output data signals to a plurality of serially-connected output data ports from a transmitter, said system comprising a plurality of output data ports;

an output data line serially-connecting the data ports to the transmitter for carrying the output data signals to the ports from the transmitter; and a clock signal generator for generating clock pulses and frame pulses for common system timing, where each frame pulse defines a frame of clock pulses;

wherein each data port comprises an address circuit at each port for determining when that port is enabled to receive output data signals from the output data line, wherein the address circuit comprises a frame pulse detector connected to the clock line for providing a frame detect signal in response to each frame pulse;

an address register for storing a preselected count that determines when the port is enabled to receive data from the output data line;

a clock pulse counter for counting clock pulses beginning with each frame detect signal and coupled to the address register for providing a transfer signal when said clock pulse count equals the stored preselected count; and a transfer control circuit coupled to the clock pulse counter for enabling the output data signals to be transferred from the output data line until the transfer signal is provided by the clock pulse counter;

an output shift register that is connected to the transfer control circuit and responsive to the clock signals for temporarily storing output data signals received from the output data line immediately prior to said provision of the transfer signal by the clock pulse counter; and a latch connected to the output shift register for unloading the temporarily stored output data signals from the output shift register in response to each frame detect signal.

4. A system according to claim 3, further comprising a clock line for carrying the clock pulses and frame pulses from the clock signal generator to the data ports.

5. A telemetry system for transferring input data signals from a plurality of serially-connected input/output data ports to a receiver and for transferring output data signals for the plurality of data ports from a transmitter, said system comprising a plurality of input/output data ports;

an input data line serially-connecting the data ports to the receiver for carrying the input data signals from the ports to the receiver;

an output data line serially connecting the data ports to the transmitter for carrying the output data signals to the ports from the transmitter; and a clock signal generator for generating clock pulses and frame pulses for common system timing, where each frame pulse defines a frame of clock pulses;

wherein each data port comprises an address circuit at each port for determining when that port is enabled to transfer input data signals onto the input data line and to receive output data signals from the output data line, wherein the address circuit comprises a frame pulse detector connected to the clock line for providing a frame detect signal in response to each frame pulse;

an address register for storing a preselected count that determines when the port is enabled to transfer data onto the input data line and to receive data from the output data line;

a clock pulse counter for counting clock pulses beginning with each frame detect signal and coupled to the address register for providing a transfer signal when said clock pulse count equals the stored preselected count; and a transfer control circuit coupled to the clock pulse counter for enabling the input data signal to be transferred onto the input data line to merge with input data signals transferred onto the input data line from the other data ports when the transfer signal is provided by the clock pulse counter and for enabling the output data signals to be transferred from the output data line until the transfer signal is provided by the clock pulse counter;

an input shift register that responds to each frame detect signal by loading input data signals for transfer onto the input data line, wherein the input shift register is connected to the transfer control circuit and provides the input data signals to the transfer control circuit in response to subsequent clock signals during each frame only after the transfer signal is provided by the clock pulse counter;

an output shift register that is connected to the transfer circuit and responsive to the clock signals for temporarily storing output data signals received from the output data line immediately prior to said provision of the transfer signal by the clock pulse counter; and a latch connected to the output shift register for unloading the temporarily stored output data signals from the output shift register in response to each frame detect signal.

6. A system according to claim 5, further comprising a clock line for carrying the clock pulses and frame pulses from the clock signal generator to the data ports.

* * * * *